United States Patent [19]

Stone, Jr.

[11] 4,305,971

[45] Dec. 15, 1981

[54] DRY COMPOSITION FOR USE IN BAKERY PRODUCTS

[75] Inventor: James P. Stone, Jr., Merrimack, N.H.

[73] Assignee: Berston Products, Inc., Lexington, Mass.

[21] Appl. No.: 152,336

[22] Filed: May 22, 1980

[51] Int. Cl.³ ............................................. A23D 2/00
[52] U.S. Cl. .................................... 426/653; 426/661; 426/19; 426/549
[58] Field of Search ............... 426/549, 622, 804, 653, 426/661, 19; 127/38

[56] References Cited

U.S. PATENT DOCUMENTS 1,900,094  3/1933  Bohn ..................................... 426/622
4,076,845  2/1978  Johannson ........................... 426/653
4,109,018  8/1978  Thompson ........................... 426/804
4,218,485  8/1980  Lee et al. ............................. 426/555

OTHER PUBLICATIONS

*Bakers Digest*, "Ascorbic Acid as a Flour Improver", Tesen, Oct. 1964, pp. 44–49 and p. 59.

*Primary Examiner*—David M. Naff
*Assistant Examiner*—Elizabeth A. Hatcher
*Attorney, Agent, or Firm*—Richard L. Johnston

[57] ABSTRACT

Vital wheat gluten in bakery products is replaced with a composition consisting essentially of wheat flour, wheat gluten and heat and acid converted corn starch dextrin. The composition may also contain potassium bromate, ascorbic acid and/or pre-gelatinized wheat starch. The composition enables the production of bakery products as good as obtained by the use of vital wheat gluten per se.

7 Claims, No Drawings

DRY COMPOSITION FOR USE IN BAKERY PRODUCTS

BACKGROUND

A substance known in the baking industry as "vital wheat gluten" has been used as a wheat protein supplement to improve the performance of low protein flour in the production of variety bread, rolls and white bread for many years. In bread and roll formulation where high percentages of ingredients such as rye flour, whole wheat flour, oatmeal, various grains, honey and molasses are used, vital wheat gluten is a necessity because of its strengthening properties. The various ingredients mentioned dilute the flour protein so vital wheat gluten is added to the formulation as a strengthener to help yield a well structured palatable bread product.

Vital wheat gluten is insoluble in water and therefore is very difficult to hydrate. Hydration and conditioning is very important to the functionality of vital wheat gluten. Presently hydration and conditioning of wheat gluten is achieved by a dough fermentation time of 4–5 hours. However, even this long fermentation time does not develop wheat gluten enough to realize its full strengthening potential.

Wheat protein is made up of two fractions, glutenin and gliadin. Glutenin contributes extensibility, strength and firmness to a dough. Gliadin, on the other hand, is softer and more fluid and contributes cohesiveness and elasticity to a dough.

All commercial vital wheat gluten is manufactured by kneading hard wheat flour containing 10.5%–15.5% by weight protein with water in some manner to wash out the starch. Approximately 15% of the flour is recovered as gluten and 65–70% recovered as starch.

Bread and roll doughs containing vital wheat gluten have better mixing and fermentation tolerance, absorb more water, and handle better through processing machinery. Baked products have improved volume, grain, texture, are more uniform and stay fresh longer.

A principal object of the present invention is to provide compositions useful in making bakery products which have a lower protein content, as wheat gluten, than vital wheat gluten but are unique because they can be employed in place of vital wheat gluten per se and yet have the same strengthening properties and make wheat gluten function to its fullest potential by rapid hydration and dispersion.

BRIEF SUMMARY OF THE INVENTION

The invention provides new and useful compositions for making bakery products consisting essentially of wheat flour, wheat gluten, heat and acid converted corn starch dextrin, together with potassium bromate and ascorbic acid or pre-gelatinized wheat starch.

DETAILED DESCRIPTION OF THE INVENTION

In its more specific aspects, the invention provides a composition for making bakery products consisting essentially of:

| Percent by Weight | Ingredients |
| --- | --- |
| 40–80 | wheat flour, approximately 10.5–15.5% by weight protein |
| 20–60 | wheat gluten |
| 1–20 | heat and acid converted corn starch dextrin which when mixed in proportions of 0.25% by weight with hard red spring wheat flour and water sufficient to form a dough reduces mixing time required to obtain maximum dough development by at least 50% as compared to the mixing time for maximum dough development without the addition of said dextrin |
| 0–fraction of 1% | potassium bromate |
| 0–fraction of 1% | ascorbic acid |
| 0–20% | pregelatinized wheat starch, making a total of 100% |

In general the invention contemplates three different compositions hereinafter referred to as Compositions A, B and C as follows:

Composition A

| | Percent by Weight |
| --- | --- |
| Vital wheat gluten | 40–60 |
| Spring wheat flour or clear flour (13.5–15.5% protein) | 40–60 |
| Dextrinized corn starch (Dextrin 4A) | 1–15 |
| Potassium bromate | .00055–.0022 |
| Ascorbic acid | .00055–.0022 |
| Total | 100% |

Composition B

| | Percent by Weight |
| --- | --- |
| Vital wheat gluten | 20–40 |
| Spring wheat flour or clear flour (13.5–15.5% protein) | 60–80 |
| Dextrinized corn starch (Dextrin 4A) | 1–15% |
| Potassium bromate | .00055–.0022 |
| Ascorbic acid | .00055–.0022 |
| Total | 100% |

Composition C

| | Percent by Weight |
| --- | --- |
| Vital wheat gluten | 20–50 |
| Spring wheat flour or clear flour (13.5–15.5% protein) | 50–80 |
| Dextrinized corn starch (Dextrin 508) | 1–20 |
| Pre-Gelatinized wheat starch | 1–20 |
| Total | 100% |

In the foregoing compositions the wheat gluten has the following typical analysis:

| | Percent by Weight |
| --- | --- |
| Moisture | 5.5 |
| Protein | 75.5 |
| Fat | 1.0 |
| Ash | 0.9 |
| Aborption of water | 155.0 |

The pre-gelatinized wheat starch is a commercially available product made by mixing wheat starch with water, then heating to the optimum gelatinization point, thereafter drying the mixture to separate the water from the starch. The remaining pre-gelatinized starch is soluble in cold water and offers a high water binding capacity. Generally, one part by weight pre-gelatinized wheat starch will absorb nine parts by weight of water.

Ascorbic acid and potassium bromate are well known substances, both of which have been used heretofore in making bakery products.

Ascorbic acid has long been recognized as a flour improver. Although it is itself a reducing agent, it acts as an oxidant in the conventional dough system by being first oxidized to dehydro-1-ascorbic acid, the oxidation being catalyzed in the presence of oxygen by ascorbic acid oxidase that normally occurs in flour.

Ascorbic acid stabilizes the dough by oxidizing the sulfhydryl groups of flour during the mixing and make-up stages of yeast raised dough processing.

Potassium bromate is an oxidizing agent that functions in a similar manner to ascorbic acid. Bromate reacts in the latter stages of dough processing, from the time the dough rises to the early stages of baking.

Both ascorbic acid and potassium bromate improve the gas retention of yeast raised dough which helps to improve the volume, grain and texture of baked goods.

Dextrin 4A is a commercially available heat and acid converted corn starch dextrin which when mixed in proportions of 0.25% by weight with hard red spring wheat flour and water sufficient to form a dough reduces mixing time required to obtain maximum dough development by at least 50% as compared to the mixing time for maximum dough development without the addition of said dextrin. Dextrin 508 is also a commercially available product which is a heat and acid converted corn starch dextrin similar to Dextrin 4A but further reduces the mixing time required to obtain maximum dough development.

The invention will be further illustrated but is not limited by the following examples in which the quantities are by weight unless otherwise indicated.

EXAMPLE I

This is an example of the preparation of Composition A. This composition was prepared by intimately mixing the following ingredients to a minute particle size:

| Ingredients | Parts by Weight |
| --- | --- |
| Bread wheat flour (14–15.5% protein) | 450 |
| Vital wheat gluten | 550 |
| Dextrinized corn starch (Dextrin 4A) | 25 |
| Potassium bromate | 1.75 |
| Ascorbic acid | .5625 |

The resultant composition had the following analysis:

| | Percent by Weight | |
| --- | --- | --- |
| Moisture | 7.00 | |
| Protein | 48.00 | |
| Fat | 1.65 | |
| Ash | .75 | |
| Absorption of water | 175 | |
| Granulation | 100 | through 45 U.S. Standard Sieve Series |
| | 95 | through 80 U.S. Standard Sieve Series |

EXAMPLE II

The procedure was the same as in Example I except that the following ingredients were used:

| Ingredients | Parts by Weight |
| --- | --- |
| Bread wheat flour (14.5–15.5% protein) | 800 |
| Vital wheat gluten | 250 |
| Dextrinized corn starch (Dextrin 4A) | 24 |
| Potassium bromate | 1.8 |
| Ascorbic acid | .5625 |

The resultant composition had the following analysis:

| | Percent by Weight | |
| --- | --- | --- |
| Moisture | 7.50 | |
| Protein | 28.00 | |
| Fat | 1.65 | |
| Ash | .65 | |
| Absorption of water | 150. | |
| Granulation | 100 | through 45 U.S. Standard Sieve Series |
| | 95 | through 80 U.S. Standard Sieve Series |

EXAMPLE III

The procedure was the same as in Example I except that the following ingredients were employed:

| Ingredients | Parts by Weight |
| --- | --- |
| Bread wheat flour (11.5–15.5% protein) | 580 |
| Vital wheat gluten | 230 |
| Dextrinized corn starch (Dextrin 50%) | 30 |
| Pre-gelatinized wheat starch | 160 |

EXAMPLE IV

This example illustrates the use of Composition A in a soft roll formulation employing the conventional sponge and dough method:

| SPONGE: | |
| --- | --- |
| Ingredients | Pounds |
| Bread flour (11.7%–12% protein) | 70 |
| Water | 40 |
| Yeast | 3.5 |
| Yeast food | 0.5 |

The ingredients were mixed for 1 minute at low speed and 4 minutes at high speed at a temperature of 76° F. and allowed to ferment for 4 hours.

| DOUGH: | |
| --- | --- |
| Ingredients | Pounds |
| Bread flour (11.7%–12% protein) | 30 |
| Water | 19 |
| Liquid sugar | 15 |
| Lard or shortening | 6 |
| Composition A (Example I) | 2 |
| Salt | 2 |
| Monoglyceride | 0.5 |

The sponge was added to the dough and mixed for 1 minute at low speed and 12 minutes at high speed at a temperature of 76° F. and allowed to ferment for 0–5 minutes.

EXAMPLE V

This example illustrates the use of Compositions B and C in a soft roll formulation using the sponge and dough method:

| SPONGE: | |
|---|---|
| Ingredients | Pounds |
| Bread flour (11.7%–12% protein) | 70 |
| Water | 40 |
| Yeast | 3.5 |
| Yeast food | 0.5 |

The ingredients were mixed for 1 minute at low speed and 4 minutes at high speed at a temperature of 76° F. and allowed to ferment for 4 hours.

| DOUGH: | |
|---|---|
| Ingredients | Pounds |
| Bread flour (11.7%–12% protein) | 30 |
| Water | 16 |
| Liquid sugar | 15 |
| Lard or Shortening | 6 |
| Compositions B or C (Examples II or III) | 2 |
| Salt | 2 |
| Monoglyceride | 0.5 |

The sponge was added to the dough and mixed for 1 minute at low speed and 12 minutes at high speed at a temperature of 76° F. and allowed to ferment for 0–5 minutes.

In the foregoing compositions the dextrinized corn starch helps the water to penetrate the flour protein and thereby increases the rapidity of hydration and dispersion. Ascorbic acid functions to stabilize the dough through the mixing and make-up procedure. Potassium bromate takes over where ascorbic acid stops functioning and stabilizes the dough during the time it rises through the early stages of baking. Hard wheat flour and pre-gelatinized wheat starch absorp and retain water in the mixed dough. Pre-gelatinized wheat starch also helps to improve the structure, grain and texture of the finished baked product.

The compositions of the invention offer the baker an economical and functional alternative to vital wheat gluten per se. Although the compositions of the invention have a lower protein content than vital wheat gluten, they function as well as or better than the vital wheat gluten because of their rapid hydration and dispersion throughout the dough system. The compositions of the invention are especially important because they make it possible to prepare baked products which are at least as good as those obtained by the use of vital wheat gluten per se and less costly.

The invention is hereby claimed as follows:

1. A dry composition for use in making bakery products consisting essentially of:

| Percent by Weight | Ingredients |
|---|---|
| 40–80 | wheat flour, approximately 10.5–15.5% by weight protein |
| 20–60 | wheat gluten |
| 1–20 | heat and acid converted corn starch dextrin which when mixed in proportions of 0.25% by weight with hard red spring wheat flour and water sufficient to form a dough reduces mixing time required to obtain maximum dough development by at least 50% as compared to the mixing time for maximum dough development without the addition of said dextrin |
| 0-fraction of 1% | potassium bromate, |
| 0-fraction of 1% | ascorbic acid, and |
| 0–20% | pre-gelatinized wheat starch, making a total of about 100%. |

2. A dry composition as claimed in claim 1 in which the quantity of wheat flour is within the range of 40–60% by weight, the quantity of wheat gluten is within the range of 40–60% by weight, the quantity of heat and acid converted corn starch dextrin is within the range of 1–15% by weight, the quantity of potassium bromate is within the range of 0.00055–0.0022% by weight and the quantity of ascorbic acid is within the range of 0.00055–0.0022% by weight.

3. A dry composition as claimed in claim 1 in which the quantity of wheat flour is within the range of 60–80% by weight, the quantity of wheat gluten is within the range of 20–40% by weight, the quantity of heat and acid converted corn starch dextrin is within the range of 1–15% by weight, the quantity of potassium bromate is within the range of 0.00055–0.0022% by weight and the quantity of ascorbic acid is within the range of 0.00055–0.0022% by weight.

4. A dry composition as claimed in claim 1 in which the quantity of wheat flour is within the range of 50–80% by weight, the quantity of wheat gluten is within the range of 20–50% by weight, the quantity of heat and acid converted corn starch dextrin is within the range of 1–20% by weight, and the quantity of pre-gelatinized wheat starch is within the range of 1–20% by weight.

5. A dry composition as claimed in claim 1 which consists essentially of 450 parts by weight bread wheat flour containing 14.5–15.5% protein, 550 parts by weight vital wheat gluten, 25 parts by weight dextrinized corn starch, 1.75 parts by weight potassium bromate and 0.5625 part by weight ascorbic acid.

6. A dry composition as claimed in claim 1 which consists essentially of 800 parts by weight bread wheat flour containing 14.5–15.5% protein, 250 parts by weight vital wheat gluten, 24 parts by weight dextrinized corn starch, 1.8 parts by weight potassium bromate, and 0.5625 part by weight ascorbic acid.

7. A dry composition as claimed in claim 1 which consists essentially of 580 parts by weight bread wheat flour containing 11.5–15.5% protein, 230 parts by weight vital wheat gluten, 30 parts by weight dextrinized corn starch and 260 parts by weight pre-gelatinized wheat starch.

* * * * *

UNITED STATES PATENT AND TRADEMARK OFFICE
CERTIFICATE OF CORRECTION

PATENT NO. : 4,305,971

DATED : December 15, 1981

INVENTOR(S) : JAMES P. STONE, Jr.

It is certified that error appears in the above-identified patent and that said Letters Patent are hereby corrected as shown below:

Column 3, line 40,"(14-15.5% protein)" should read
--(14.5-15.5% protein)--.

Column 4, line 3 under "Ingredients" in Example III,
"(Dextrin 50%)" should read --(Dextrin 508)--.

Signed and Sealed this

Seventeenth Day of August 1982

[SEAL]

Attest:

GERALD J. MOSSINGHOFF

Attesting Officer — Commissioner of Patents and Trademarks